United States Patent Office 2,925,291
Patented Feb. 16, 1960

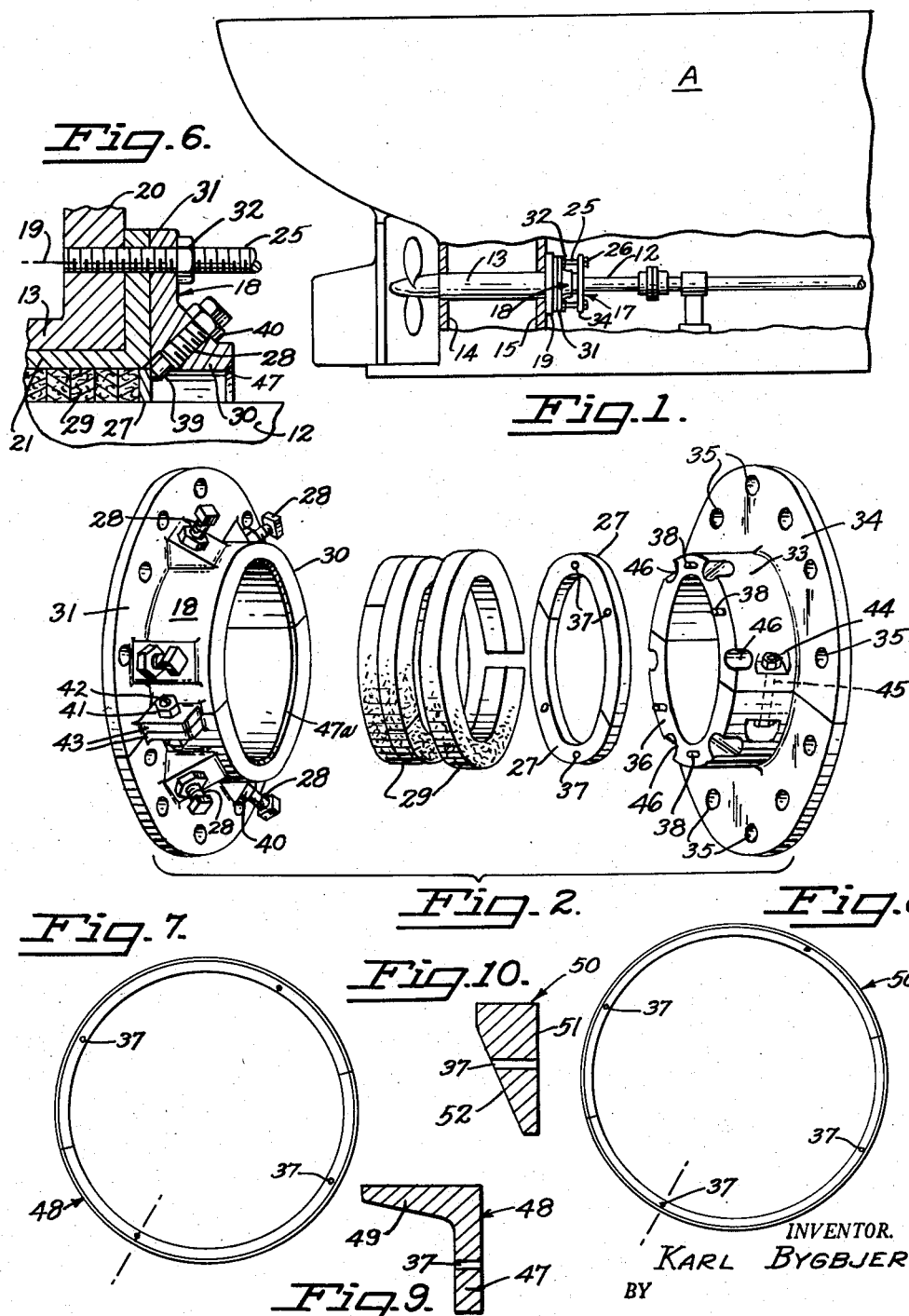

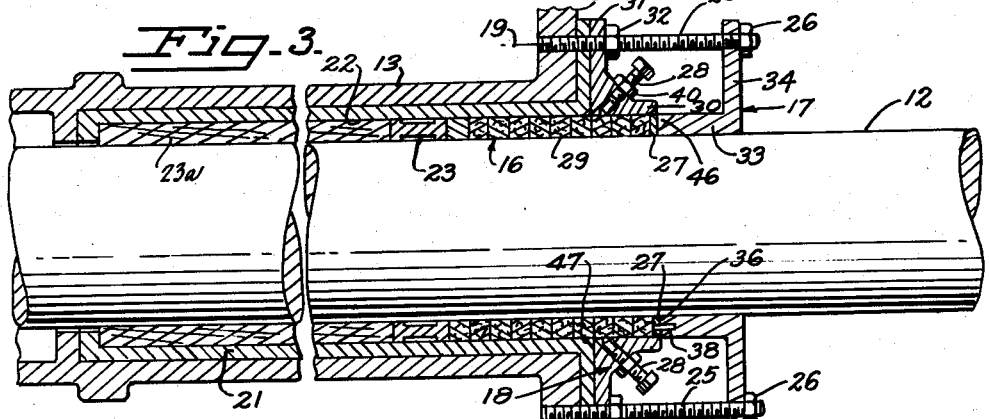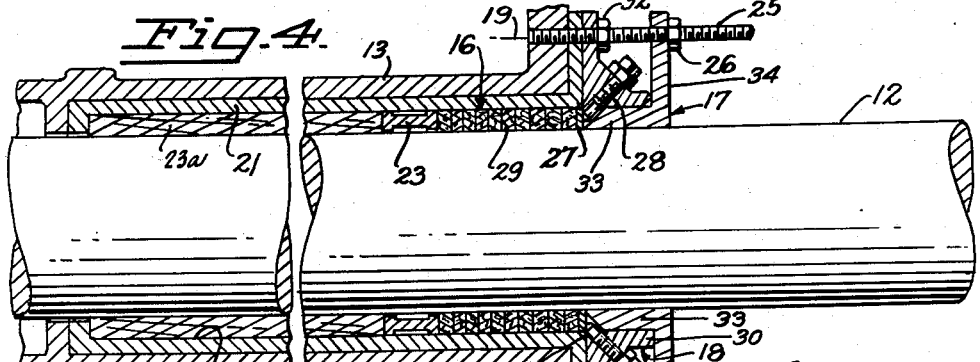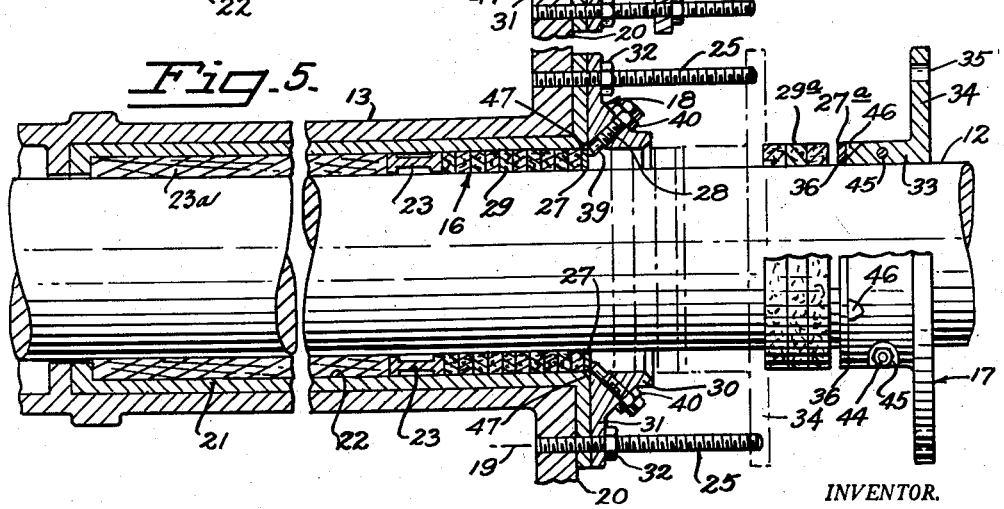

2,925,291
TAIL SHAFT PACKING SEAL

Karl Bygbjerg, San Francisco, Calif., assignor to Pacific Shops, Inc., San Francisco, Calif., a corporation of California Application February 23, 1956, Serial No. 567,372

8 Claims. (Cl. 286—25)

This invention relates to packing and glands to hold packing against hydrostatic pressure and more particularly to a method and means including a gland adapter to enable a gland normally holding packing around the tail shaft of an ocean going vessel against hydrostatic pressure to be removed so additional packing may be added while the packing is under pressure.

In all large modern propeller powered vessels there is a shaft that passes through the hull of the ship to transfer power from the ship's engines to the propeller. This invention is concerned with the water seal or packing around this tail shaft. In the conventional ship fibrous packing is used around the tail shaft in an area of the stern tube to form the water seal.

Unfortunately packing materials commercially available have a limited life necessitating frequent addition and change of packing. In the conventional arrangement packing cannot be added without first either drydocking the vessel or sealing off the seaward side of the stern tube leading to the stuffing box to block the hydrostatic pressure. A member, hereinafter called a gland, physically interferes with the mouth of the stuffing box making it impossible to add packing with the gland in place. In the conventional arrangement the gland cannot be removed when the packing is under pressure without endangering the old packing and allowing it to give way to the sea head.

To illustrate the magnitude of the problem in a conventional victory ship of the C3 class, which is an ocean-going freighter, the average circumference of packing around the ship's tail shaft is approximately 6 feet and 1.25 inches thick. There is, therefore, .625 square feet of sea head facing the packing. The average depth or head against the packing varies from approximately 10 feet when the ship is unloaded to 20 feet when the ship has a normal load. Extreme loads or heavy seas sometimes increase the head to 30 or more feet. Hydrostatic force in the packing is computed by multiplying the sea head facing the packing area times the average depth times 64 pounds per square foot. The above vessel, therefore, has an unloaded pressure against the packing of 400 pounds, and 800 pounds when the vessel is loaded with normal cargo. Should the tail shaft be as much as 30 feet under water there would be 1200 or more pounds of pressure acting against the packing. Heretofore, the gland was necessary to hold the packing against this pressure.

In heavy seas the tail shaft may tend to whip, thus causing increased and rapid wear of the packing. Under such circumstances it is obviously impossible to seal off the seaward side of the packing box. Many vessels have been in difficulties because with the conventional arrangement additional packing cannot be added. During storms it is not uncommon for all the packing to be destroyed, causing a dangerous and costly situation.

Packing material contains various lubricants which, after a period of use, are lost and the resultant tendency is for greater friction to develop. When old and worn packing is held tight enough to hold leakage at the proper level friction between tail shaft and packing develops heat and is likely to cause costly scoring of the bushing surface of the tail shaft.

In this invention there is provided a modification of the conventional packing gland by provision of a device, hereinafter called a gland adapter, to hold old packing in place against the sea head during removal of the gland so that new packing may be added to the tail shaft stuffing box even when the ship is subjected to heavy seas and while the ship is underway.

A principal object of this invention is to provide a new and useful mechanism which allows the gland to be removed and new packing installed while still maintaining existing packing in place.

A further object of the invention is to provide a gland adapter mechanism of the type mentioned which is bolted around an existing ship's bolt circle adjacent the stuffing box part of the stern tube and between the stern tube and the gland and which may be easily installed on existing vessels. The mechanism enables repacking of the stuffing box without drydocking.

And still another object is to provide a method and means to allow new tail shaft packing to be installed while the ship is afloat and in an emergency even while the ship is underway.

A still further object of the invention is to provide an apparatus which is adapted for installation to existing conventional packing or stuffing box equipment to enable a vessel to have packing added to the stuffing box with the gland removed with perfect safety to vessel and ship's personnel.

Yet still another object of the invention is to provide a device which allows a ship to have new packing added at a fraction of the cost and effort hereinbefore required with conventional packing or stuffing boxes and gland assemblies.

Another object of the invention is to provide means for constantly keeping the packing of a vessel at an optimum operating level to prevent undesirable water leakage and damage and wear to the tail shaft and associated parts of the vessel.

Other objects of the present invention will become apparent upon reading the following specification and referring to the accompanying drawings in which similar characters of reference represent corresponding parts in each of the several views.

In the drawings:

Figure 1 is a diagrammatic view partially in section of the tail section of a seagoing vessel with portions cut away to show the location and structure of the tail shaft and stern tube assemblies;

Figure 2 is an exploded perspective view of various parts of an embodiment of the invention;

Figure 3 is a sectional view of the stern tube and gland assembly with the gland adapter improvement of the invention added thereto shown with complete new packing;

Figure 4 is a view similar to Fig. 3 shown in a position of adjustment just prior to removal of the gland in which the packing is anchored in place against the sea head independently of the gland;

Figure 5 is a similar view of Fig. 4 shown with the gland removed and with additional packing added in readiness for insertion into the stuffing box area of the stern tube;

Figure 6 is an enlarged fragmentary section of components holding packing against hydrostatic pressure.

Figure 7 is a modification of a packing retaining component of the invention;

Figure 8 is another modification of the component of Fig. 7;

Figure 9 is an enlarged sectional view of the component of Fig. 7; and

Figure 10 is an enlarged sectional view of the component of Fig. 8.

Referring now to the drawings, and with particular reference to Fig. 1, tail shaft 12 of a conventional seagoing vessel is rotatably supported within a stern tube 13. The stern tube is carried by support members, such as upwardly extending bulkheads 14 and 15.

In greater detail Figs. 3, 4 and 5 show a pocket formed in the forward of stern tube 13 between the tube and tailshaft 12 hereinafter called stuffing or packing box 16. In one embodiment of this invention a gland 17 and an annular frame hereinafter called a gland adapter 18 are mounted to a conventional bolt circle 19 formed in a collar 20 on the forward side of stern tube 13.

Referring to Figs. 3, 4 and 5, generally stern tube 13 is lined with a bushing 21 which forms the outside wall of bearings 23ª, stuffing box 16, lantern ring 23 and packing 29. Lantern ring 23 forms the aft end of the stuffing box separating it from water lubricated bearing 23ª.

In the conventional arrangement a gland is held by twelve cinch bolts 25 threaded into bolt circle 19 and is cinched by tightening twelve nuts 26. The only adjustment of packing in this arrangement is obtained by cinching nuts 26 to cause the gland to compress the packing.

The essence of this invention is to provide a packing retainer ring 27 moved by gland 17 to an operable position within stern tube 13 where ring anchor members 28 carried by gland adapter 18 are operable to engage the ring. In this condition packing is held in place against the sea head by the ring while the gland is removed. New packing can then be added without danger of flooding the ship.

Packing 29 is made of a fibrous substance impregnated with lubricant such as graphite and oils. Usually the packing is in the form of a split ring and is generally approximately square in cross section. The packing is disposed around shaft 12 to form a controllably tight lubrication seal. Gland 17 is slidably arranged on the tail shaft so that it may be cinched up against the packing to compress same. During normal operation the gland is cinched up from time to time to compensate for loss of packing due to wear. The normal and most efficient adjustment allows a small amount of water leakage to assist in cooling and lubrication.

Gland adaptor 18 comprises a stern tube extension collar 30 and a bolt circle mounting flange 31. The flange is anchored to the bolt circle so that the inside diameter of the collar and the stern tube are approximately equal and coaxially mounted. Cinch bolts 25 and twelve gland adaptor nuts 32 are arranged to permanently abut the gland adaptor to stern tube 13.

Gland 17 comprises collar or sleeve 33 mounted slidably on shaft 12 and an annular upstanding flange 34 formed with holes 35 to receive cinch bolts 25. The outside diameter of sleeve 33 is equal to or less than the inside diameter of collar 30 so that the sleeve will telescope within the collar when the gland is cinched. Forward face 36 of sleeve 33 is flat, annular and disposed normal to the longitudinal axis of the said shaft. Face 36 has 4 dowel pins 38 adapted to receive packing retainer ring 27 and register the ring with said face.

The gland adapter is provided with six holes spaced at equal radial distances from one another. A similar number of ring anchor members 28 comprising bolts are engaged with the holes and inclined at an acute angle towards the stern tube to enter the bore of the collar at approximately 45°. Each member 28 is formed with its tip 39 having a 45° cone-shaped face with the stern portion of the face of the cone normal to the longitudinal axis of shaft 12 and parallel to the forward side of ring 27. Threads are removed from all of tip 39 that enters the bore of collar 30 to lessen the possibility of tip 39 damaging packing.

Ring 27 comprises two 180° segments with ends abutting one another. The material from which ring 27 is made should be a high density material with sufficient strength and rigidity to coact with anchor members 28 to hold packing against hydrostatic pressure, but as a safety factor should be soft enough not to score the tail shaft should it actually make contact therewith. Should the safety factor not be desired hard metal such as stainless steel may be used for the ring. A softer substance such as "Micarta," is a satisfactory material where a safety factor is desired. "Micarta" is a trade name for a product of the Westinghouse Electric Corporation which is essentially a laminated plastic material containing a canvas or linen base sealed with resin under heat and pressure to form a very rigid material soft enough not to score shaft 12 should it actually make contact with the shaft. The outside diameter of the ring is such that the two 180° segments act against each other to have a sliding contact with bore walls of collar 30 and tube 13. The inside diameter is sufficiently greater than the tail shaft to allow adequate running clearance between shaft and ring. This clearance is desirable to prevent damaging scoring contact between the shaft and ring.

Ring 27 is tightly sandwiched between face 36, packing 29 and the bore walls of collar 30 or packing box 16 so that it is impossible for the abutting ends of the ring to be displaced one from another. As gland 17 is cinched up to compress packing 29, ring 27 remains in juxtaposition to face 36 so that the ring remains with the forward face on a plane normal to the longitudinal axis of tail shaft 12. Sleeve 33 is of exactly the right length to position the ring in an operative position with respect to the ring anchor members 28 when gland 17 is cinched to its limit of adjustment against collar 30.

The gland adapter is provided with six notches 46 in sleeve 33 and face 36 to allow anchor member set screws 28 to pass through the notches to bypass the sleeve to make operative contact with the ring. When gland 17 is tightly against collar 30, anchor set screws 28 are then screwed into the bore of collar 30 and engage in juxtaposition with the forward side of ring 27. The length of set screws 28 is such that tip 39 of each of the six screws engages the ring on an exact plane so that the ring-engaging portion of each face 39 is on a common plane in juxtaposition with the bow side of ring 27. The screws thus provide six potential pressure points against the ring, each of which is caused to bear an equal load against the ring at a plane parallel with face 36 when gland 17 is removed. The length of the set screws determines a limit for correct adjustment which cannot be accidentally increased for any one set screw by cinching it too tightly against the ring. The two 180° segments of the ring are sufficiently wide at their abutting ends to prevent longitudinal displacement from each other should any one or more set screws be turned to their limit of travel while the remaining set screws remain in their normal position. Face 36 should be on a plane normal to the longitudinal axis of tail shaft 12.

The anchor member set screws are adjusted to the operative position to hold the retainer rings in place only during removal of the gland. Normally the anchor member set screws are completely withdrawn from engagement with the bore of collar 30. A lock nut 40 is provided for each set screw to lock it in the inoperative position. The lock nuts prevent the set screws from being moved into damaging contact with packing within the bore of collar 30 from vibration of the tube.

For convenience of installation, both gland adapter 18 and gland 17 comprise two 180° segments. The segments of gland adapter 18 are bolted together by nuts 41 and bolts 42 via flanges 43 integral to each segment. Similarly, the gland segments are held together by bolts 45 and nuts 44. The forward face of collar 30 has an inward facing tapered annular face 47a to assist sleeve 33 to register with the collar to its telescoped position therein.

Referring now particularly to Figs. 4, 5 and 6, when a ship is initially packed all set screws 28 are retracted to an inoperative position and locked. Tail shaft 12 is provided with 7 turns of packing in stuffing box 16 and 3 turns in the bore of collar 30. Gland 17 is then forced against the packing by applying and tightening nuts 26.

As packing 29 wears, nuts 26 are progressively cinched, forcing gland 17 to compress the packing and improve the water seal. Finally, when flange 34 abuts against the forward end of collar 30 the limit of packing compression is reached. Retainer ring 27 is now just entering the stuffing box and is positioned for operative engagement by set screws 28. The inside wall of tube 13, packing 29 and face 36 tightly sandwich the ring in exact registration with the six set screws 28. At this point lock nuts 40 are released and the six ring anchor member set screws 28 are screwed to their operative position. The cone shaped tip 39 of each screw 28 passes through notch 46 to form an elongated pressure point against the forward side of ring 27.

The ring is now anchored in a position to hold packing 29 in the stuffing box against the sea head independent of gland 17. Cinch nuts 26 are then removed and gland 17 is withdrawn. With gland 17 removed, new packing 29a, identical to packing 29, is added to the area around tail shaft 12 within the bore of collar 30. As illustrated, packing 29a comprises three split rings placed around the tail shaft. Another packing retainer ring 27a, identical to ring 27, is placed on face 36.

Gland 17 is then abutted against the packing and anchored in position by cinch nuts 26. Set screws 28 are returned to inoperative position and locked.

As before, gland 17 is cinched up from time to time to keep the packing at optimum operating compression. When gland 17 reaches its ultimate adjustment retainer ring 27a is locked in position, the gland is removed and another three split rings of packing and a new ring is added. This process may be repeated as often as required.

The rings after being used to retain the packing are forced into the stuffing box by the newly added packing and there they remain until the vessel receives a major overhaul or annual drydocking. Normally, packing wears at a uniform rate gradually changing from a square shaped cross section to a more rectangular form because of uniformities of pressure exerted against the packing by the sea head gland and the shaft. The evenness of wear allows ring 27 to remain indefinitely in longitudinal alignment. For this reason the two segments of the ring remain in abutting alignment and remain free from contact with the shaft.

It is to be noted that the embodiment above described relates to an adapter for conventional vessels. It is to be appreciated that in new construction collar 30 can be integral to the stern tube.

Ring 27 may be made in a variety of configurations. The ring above described, for example, has a rectangular cross section with both opposing sides being parallel.

Another configuration for a packing retainer ring which has been found useful comprises a ring 48 with two abutting 180° segments, Figs. 7 and 9. Ring 48 has an annular collar 49 pointing aft from the periphery of a neck 47 to form an L shaped cross section. The outside surface of collar 49 is uniform in diameter while the inside surface of the collar tapers inwardly toward neck 47. This taper is convenient to wedge between packing 29 and bore walls of collar 30 as the gland is cinched into sealing position. The forward face of neck 47 is flat to abut face 36 of gland 17. Collar 49 adds structural rigidity to the ring and abuts with the bore of collar 30 to provide additional bearing area and prevent the ring from skewing in the bore of the stuffing box from a plane normal to the longitudinal axis of the tail shaft. The additional length afforded by collar 49 provides assurance against misalignment of the abutting ends of the rings two segments. It is also believed apparent that dowel or other mechanical means may be employed to fasten the abutting ends together.

Another useful configuration of a packing retainer ring comprises a ring 50 also with two 180° segments (Figs. 8 and 10). Ring 50 has a wedge shaped cross section with its forward side 51 facing gland 17 substantially normal to the longitudinal axis of shaft 12 and parallel to face 36. Aft or sea head facing side 52 of ring 50 is tapered inwardly with the thicker part of the ring being at the ring's outer periphery. In this configuration packing engaging side 52 wedges packing adjacent it inwardly toward the shaft to improve the water seal upon cinching up of gland 17. The outer periphery of the ring forms a wide bearing surface against the bore walls of the stuffing box to retain the ring in a plane normal to the longitudinal axis of the tail shaft and a greater area for retaining end to end alignment of the two ring segments.

Although the foregoing invention has been described in some detail by way of illustration and example for purposes of clarity of understanding, it is understood that certain changes and modifications may be practiced within the spirit of the invention and scope of the appended claims.

What is claimed is:

1. In combination, a packing seal with a device attached to the bolt circle of a tail shaft stuffing box of a vessel for holding packing in the stuffing box against hydrostatic pressure working against said packing during removal of a gland normally holding said packing in place, comprising: said device being an annular frame anchored to said bolt circle in coaxial alignment with said stuffing box, the bore diameter of said frame being equal to the bore diameter of said stuffing box, a packing retaining ring around said tail shaft abutting the bow end of said packing, said packing retaining ring being made of a material softer than said shaft and more rigid than said packing, said ring comprising two abutting 180° segments of substantially L-shaped cross section forming a collar portion having a uniformally equal outer diameter for bearing against the bore wall of said frame and said stuffing box and a neck with a flat forward face disposed for abutment with said gland, said ring having outer diameter substantially equal to the bore diameter of said stuffing box and formed with a bore diameter greater than the diameter of said tail shaft, ring anchor members carried by said frame, said anchor members normally in an inoperative position and movable to enter the bore of said frame to an operative position, said gland being slidably mounted on said tail shaft, means for adjustably positioning and anchoring said gland in a plurality of positions, said ring being movable by said gland to a ring anchor member engaging position with the forward face of said gland being substantially normal to the longitudinal axis of said tail shaft, said gland being formed with notches to receive a part of said anchor members whereby said anchor members are operable to pass through the notches of said gland to engage the bow side of said ring and hold said ring and said packing against force of hydrostatic pressure.

2. In an apparatus of the character described for attachment to the bolt circle of a tail shaft stuffing box of a vessel for holding packing in the stuffing box against hydrostatic pressure working against said packing during removal of a gland normally holding said packing in place, the combination of: an annular frame attached to the bolt circle in coaxial alignment with said stuffing box, said frame having a bore diameter equal to the bore diameter of said stuffing box, a packing retaining ring around said tail shaft abutting the bow end of said packing, said packing retaining ring being made of material softer than said shaft and more rigid than said packing, said ring comprising two 180° segments of substantially wedge-shaped cross-section wider at the outer diameter of the ring than at the bore of the ring to form a broad bearing surface at the outer diameter of the ring to engage the wall of the bore of said frame and said stuffing box, said ring having a coplanar forward face positioned substantially normal to the longitudinal axis of said tail shaft the outer diameter of said ring being substantially equal to the bore diameter of said stuffing box and frame and the bore diameter of said ring being greater than said tail shaft, a plurality of separate ring anchor members being carried by said frame and being operable to move at an acute angle relative to the longitudinal axis of said tail shaft into the bore area of said frame, said gland being slidably mounted on said tail shaft, means for adjustably positioning and anchoring said gland in a plurality of positions, said ring being movable by said gland to a ring anchor member engaging position with the forward face of said ring abutting said gland, said gland being formed with notches to receive said ring anchor members whereby said anchor members are operable to pass through the notches of said gland to engage the forward side of said ring and hold said ring and packing against force of hydrostatic pressure.

3. A packing seal with an adapter for attachment to the bolt circle of a tail shaft stuffing box of a vessel for holding packing in the stuffing box against hydrostatic pressure working against said packing during removal of a gland normally holding said packing in place comprising: said adapter being an annular frame anchored to said bolt circle in coaxial alignment with said tail shaft stuffing box and having a bore diameter equal to the diameter of the bore of said stuffing box, a packing retaining ring around said tail shaft abutting the bow end of said packing, said packing retaining ring being made of material softer than said shaft and more rigid than said packing, said packing retaining ring comprising two abutting segments having adjoining ends to form said ring with an outer diameter substantially equal to the diameter of the bore of said stuffing box and frame and with a bore diameter of said ring being greater than the bore diameter of said tail shaft, a plurality of separate ring anchor members being adjustably carried by said frame and being disposed to enter the bore of said frame at an acute angle relative to the longitudinal axis of said tail shaft, said anchor members being normally in an inopertaive position outside the bore area of said frame and being movable to enter the bore of said frame when in the operative position so that a portion of the tips of said frame anchor members end in coplanar relation on a plane normal to the longitudinal axis of said tail shaft, said gland being slidably mounted on said tail shaft, means for adjustably positioning and anchoring said gland in a plurality of positions, said gland being formed with notches to receive said anchor means, said ring being movable by said gland to a ring anchor member engaging position in juxtaposition to the operable position of the portion of the tips of said ring anchor members in coplanar relation whereby said anchor members pass through the notches formed in said gland to a position abutting the bow face of said ring when said ring anchor members are in the operative position to held packing against force of said hydrostatic pressure.

4. A packing seal with an adapter for attachment to the bolt circle of a tail shaft stuffing box of a vessel for holding packing in the stuffing box against hydrostatic pressure working against said packing during removal of a gland normally holding said packing in place, comprising: said adapter being an annular frame anchored to said bolt circle in coaxial alignment with said tail shaft stuffing box and having a bore diameter equal to the diameter of the bore of said stuffing box, a packing retaining ring around said tail shaft abutting the bow end of said packing, said packing retaining ring being made of material softer than said shaft and more rigid than said packing, said packing retaining ring comprising two abutting segments having adjoining ends to form said ring with an outer diameter substantially equal to the bore diameter of said stuffing box and frame and with a bore diameter being greater than the bore diameter of said tail shaft, a plurality of separate ring anchor members being adjustably carried by said frame and disposed to enter the bore area of said frame at an acute angle relative to the longitudinal axis of said tail shaft, each said ring anchor member having a cone-shaped ring engaging tip having a ring engaging portion of the tip angularly disposed in parallel alignment with a plane normal to the longitudinal axis of said tail shaft, said ring anchor members being movable to an operative positive position with the ring engaging portions of said ring anchor members disposed in coplanar relation, said gland slidably mounted on said tail shaft, means for adjustably positioning and anchoring said gland in a plurality of positions, said gland being formed with notches to receive said anchor members, said ring being movable by said gland to a ring anchor member engaging position in alignment with said gland and with the forward face of said ring disposed in juxtaposition with the ring engaging portions of the tips of said ring anchor members when said ring anchor members are in the operative position whereby said ring anchor members pass through the notches formed in said gland with the tips of said ring anchor members abutting the bow face of said ring to hold said ring and packing against force of said hydrostatic pressure.

5. An attachment for a stuffing box having a bore and a low pressure end, a cylindrical shaft coaxially arranged with respect to the stuffing box, and annular packing media interposed between the shaft and the stuffing box comprising: an annular extension member having a cylindrical bore the diameter of which is equal to the diameter of the cylindrical bore of the stuffing box, means for securing said annular extension member to the low pressure end of said stuffing box with the cylindrical bore of said annular extension member in axial alignment with the cylindrical bore of said tsuffing box and said cylindrical shaft, an annular packing gland provided with a cylindrical portion having a bore diameter larger than the diameter of the said cylindrical shaft and an outer diameter smaller than the diameter of the cylindrical bore of said stuffing box and said extension member, said annular gland and said annular extension member being telescopically arranged with respect to one another, additional annular packing media arranged in said annular extension member and interposed between said shaft and said extension member in the diametric axes and interposed between said first mentioned annular packing media and said gland in the axial axis, a retaining ring having a bore diameter larger than the diameter of said cylindrical shaft and an outer diameter smaller than the diameter of the cylindrical bore of said stuffing box and said annular extension member, said retaining ring being interposed between said shaft and said extension member in the diametric axes and interposed between said additional packing media and said gland in the axial axis, adjusting means for adjustably compressing said packing gland toward said packing media and in axial alignment with said cylindrical bore of said stuffing box and said extension member, and securing means, separate and apart from said gland, for maintaining said retaining ring against interior displacement, said gland being formed with notches aligned with said securing means to allow said securing means to be positioned between said packing retaining ring and said gland, said securing means being movable into an operable position in the notches to a position between the packing retaining ring and said gland whenever the packing media has been compressed to a predetermined extent and being movable at will to an inoperable position, whereby the packing gland may be tightened periodically until the packing media and the additional packing media have been compressed to a predetermined extent, the said packing media may be secured against interior displacement by said retaining ring and said securing means, said gland may be removed, further packing media may be interposed between the shaft and the extension member, the packing gland may be replaced, the securing means may be rendered inoperable, and the cycle of operation repeated.

6. In a stuffing box of the type having a cylindrical bore and an interior end, a cylindrical shaft coaxially arranged with respect to the stuffing box, an annular packing media interposed between the shaft and the stuffing box, and an annular packing gland provided with a cylindrical portion having an inner diameter larger than the diameter of the cylindrical shaft, and an outer diameter smaller than the diameter of the cylindrical bore of said stuffing box, said gland being telescopically arranged with respect to said stuffing box, the combination of: a packing retaining ring reciprocally mounted in said stuffing box between said packing media and said gland; ring anchor means mounted on the wall of said stuffing box to move said ring anchor means into said stuffing box, and said gland being formed with a plurality of notches on the forward face of the gland; each said notch being aligned with a respective anchor means to allow said anchor means to sandwich between said gland and said retainer ring.

7. In a stuffing box of the type having a cylindrical bore and an interior stern end, a cylindrical shaft coaxially arranged with respect to the stuffing box, an annular packing media interposed between the shaft and the stuffing box, and an annular packing gland provided with a cylindrical portion having an inner diameter larger than the diameter of the cylindrical shaft, and an outer diameter smaller than the diameter of the cylindrical bore of said stuffing box, said gland being telescopically arranged with respect to said stuffing box with the stern facing edge of the cylindrical portion of the gland operable to compress said annular packing media against the stern end of the stuffing box, the combination of: a packing retainer ring interposed between the stern facing edge of said gland and said packing media; a plurality of ring anchor means mounted on the walls of said stuffing box; means to move said ring anchor means to a first position within said stuffing box; said ring anchor means each having a stern facing face positioned and arranged in coplanar alignment on a predetermined plane when said ring anchor means are in said first position; and stop means to limit sternward movement of said gland at a first position whereat the forward edge of said gland is in substantially coplanar alignment with said fixed predetermined plane.

8. The combination of claim 7 and wherein the stern facing edge of said gland is notched in alignment with said ring anchor means to allow said ring anchor means to move to the first position while said gland is in the first position.

References Cited in the file of this patent

UNITED STATES PATENTS

| | | |
|---|---|---|
| 315,350 | Shook | Apr. 7, 1885 |
| 1,015,884 | Haaser | Jan. 30, 1912 |
| 1,028,758 | Mason et al. | June 4, 1912 |
| 1,983,130 | Hermann | Dec. 4, 1934 |
| 2,090,769 | Weisz | Aug. 24, 1937 |

FOREIGN PATENTS

| | | |
|---|---|---|
| 1,793 | Great Britain | of 1892 |